(12) United States Patent
Zhao et al.

(10) Patent No.: US 10,375,199 B2
(45) Date of Patent: Aug. 6, 2019

(54) SYSTEMS AND METHODS FOR SURVEYING USERS

(71) Applicant: Facebook, Inc., Menlo Park, CA (US)

(72) Inventors: Shiyu Zhao, Union City, CA (US); Matthew K. Choi, Menlo Park, CA (US); Nicholas Scott LaGrow, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 566 days.

(21) Appl. No.: 14/984,899

(22) Filed: Dec. 30, 2015

(65) Prior Publication Data

US 2017/0195452 A1    Jul. 6, 2017

(51) Int. Cl.
*G06Q 50/00*     (2012.01)
*H04L 12/58*    (2006.01)
*H04L 29/08*    (2006.01)
*G06F 15/16*    (2006.01)

(52) U.S. Cl.
CPC .......... *H04L 67/306* (2013.01); *G06Q 50/01* (2013.01); *H04L 51/32* (2013.01); *H04L 67/2842* (2013.01)

(58) Field of Classification Search
CPC ... H04L 67/306; H04L 51/32; H04L 67/2842; G06Q 50/01
USPC ................................................. 709/204, 201
See application file for complete search history.

(56) References Cited

U.S. PATENT DOCUMENTS

| | | | | |
|---|---|---|---|---|
| 9,514,766 | B1* | 12/2016 | Joshi | G10L 21/049 |
| 2010/0030969 | A1* | 2/2010 | Basham | G06F 12/0806 |
| | | | | 711/126 |
| 2011/0076663 | A1* | 3/2011 | Krallman | G09B 7/00 |
| | | | | 434/362 |
| 2014/0229614 | A1* | 8/2014 | Aggarwal | H04M 3/2227 |
| | | | | 709/224 |
| 2014/0358636 | A1* | 12/2014 | Nowak | G06Q 30/0203 |
| | | | | 705/7.32 |
| 2015/0324821 | A1* | 11/2015 | Rincon | G06Q 30/0203 |
| | | | | 705/7.33 |
| 2017/0046110 | A1* | 2/2017 | He | G06F 3/1415 |

* cited by examiner

*Primary Examiner* — David R Lazaro
*Assistant Examiner* — Mariegeorges A Henry
(74) *Attorney, Agent, or Firm* — Sheppard Mullin Richter & Hampton LLP

(57) ABSTRACT

Systems, methods, and non-transitory computer-readable media can determine at least one survey to be presented to users of the social networking system, wherein the survey is targeted to a number of users at each time interval. A uniform distribution of users that may be surveyed is determined, wherein users in the uniform distribution are each assigned a numerical value. A sampling window that references a numerical range that is adjusted upon completion of each time interval is determined, wherein users that have been assigned a numerical value within the numerical range are eligible for the survey.

19 Claims, 7 Drawing Sheets

500

```
┌─────────────────────────────────────────────────────┐
│  Determine at least one survey to be presented to users │
│  of the social networking system, wherein the survey is │
│    targeted to a number of users at each time interval  │
│                         502                             │
└─────────────────────────────────────────────────────┘
                            │
                            ▼
┌─────────────────────────────────────────────────────┐
│     Determine a uniform distribution of users that      │
│     may be surveyed, wherein users in the uniform       │
│     distribution are each assigned a numerical value    │
│                         504                             │
└─────────────────────────────────────────────────────┘
                            │
                            ▼
┌─────────────────────────────────────────────────────┐
│  Determine a sampling window that references a numerical range │
│     that is adjusted upon completion of each time interval     │
│                         506                             │
└─────────────────────────────────────────────────────┘
```

FIGURE 5

SYSTEMS AND METHODS FOR SURVEYING USERS

FIELD OF THE INVENTION

The present technology relates to the field of surveying users. More particularly, the present technology relates to techniques for surveying users through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content provider platform (e.g., a social networking system). Users can operate their computing devices to access the content items through the platform. Typically, the content items can be provided, or uploaded, by various entities including, for example, content publishers and also users of the content provider platform.

SUMMARY

Various embodiments of the present disclosure can include systems, methods, and non-transitory computer readable media configured to determine at least one survey to be presented to users of the social networking system, wherein the survey is targeted to a number of users at each time interval. A uniform distribution of users that may be surveyed is determined, wherein users in the uniform distribution are each assigned a numerical value. A sampling window that references a numerical range that is adjusted upon completion of each time interval is determined, wherein users that have been assigned a numerical value within the numerical range are eligible for the survey.

In an embodiment, the systems, methods, and non-transitory computer readable media are configured to provide a respective user ID of each user to a hash function as input to obtain a corresponding numerical value for the user.

In an embodiment, the systems, methods, and non-transitory computer readable media are configured to determine that a first user is eligible for the survey and provide data describing the survey to a computing device of the first user, wherein the survey is presented through an interface of the computing device.

In an embodiment, the systems, methods, and non-transitory computer readable media are configured to receive a response to the survey from the computing device.

In an embodiment, the survey is presented in a content feed corresponding to the first user.

In an embodiment, the systems, methods, and non-transitory computer readable media are configured to provide data describing the survey to a computing device of a first user, wherein the survey is cached by the computing device until the sampling window references a numerical range that includes a numerical value assigned to the first user.

In an embodiment, the systems, methods, and non-transitory computer readable media are configured to determine that a first user is eligible for the survey, determine that the first user has performed the at least one triggering action while being eligible for the survey, and provide data describing the survey to a computing device of the first user, wherein the survey is presented through an interface of the computing device.

In an embodiment, the systems, methods, and non-transitory computer readable media are configured to determine a specified number of users to be presented with the survey at each time interval and determine a size of the numerical range referenced by the sampling window based at least in part on the specified number of users.

In an embodiment, the systems, methods, and non-transitory computer readable media are configured to determine a number of desired responses for the survey, determine a response rate of the users, and determine a size of the numerical range referenced by the sampling window based at least in part on the number of desired responses and the response rate.

In an embodiment, the systems, methods, and non-transitory computer readable media are configured to determine a number of desired responses for the survey, determine a first rate at which the users are expected to respond to the survey, determine a second rate at which users are expected to perform a triggering action associated with the survey, and determine a size of the numerical range referenced by the sampling window based at least in part on the number of desired responses, the first rate, and the second rate.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method for surveying users, according to an embodiment of the present disclosure.

Figure 1:
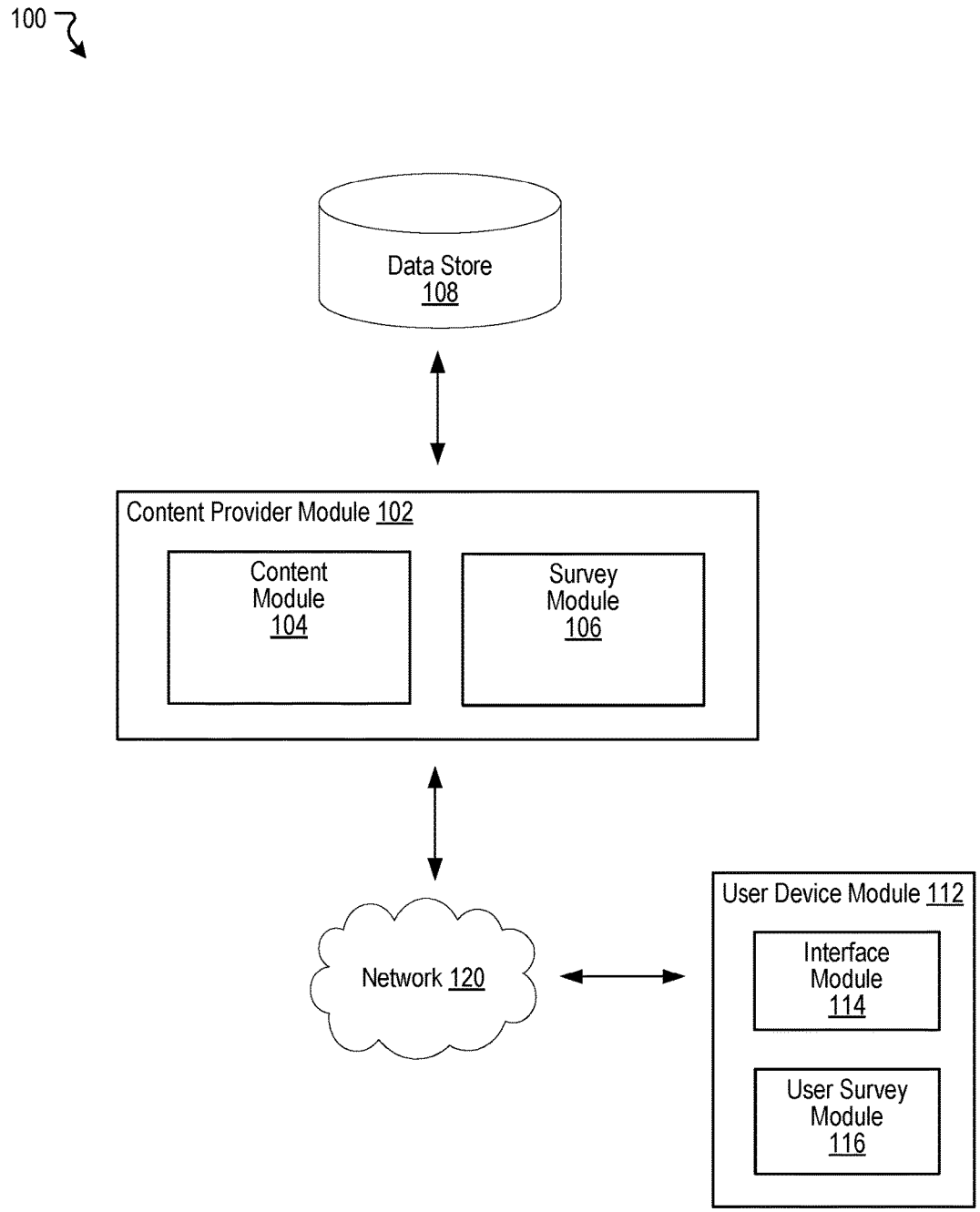
FIG. 1 illustrates an example system including an example content provider module and a user device module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Surveying Users

People use computing devices (or systems) for a wide variety of purposes. As mentioned, under conventional approaches, a user can utilize a computing device to share content items (e.g., documents, images, videos, audio, etc.) with other users. Under conventional approaches, content items can be made available through a content sharing platform, e.g., a social networking system. Users can operate their computing devices to access the content items through the platform. Typically, the content items can be provided, or uploaded, by various entities including, for example, content publishers and also users of the content sharing platform. In some instances, a user operating a computing device can interact with a content provider interface (e.g., a software application running on the computing device, web browser, etc.) to access content items. Such content items, or snippets (e.g., title, summary, text excerpt, images, frames, etc.) of content items, can be presented through the interface as part of a content feed, for example. In various embodiments, content items can be provided through a respective content feed (e.g., news feed) that is customized for each user of the social networking system. The content feed can include content items (or stories) that have been selected for presentation to the user. Such content items may be selected from various content items that may be provided (e.g., uploaded or shared) by other users of the social networking system or by various third-party content publishers, for example. Users can navigate (e.g., browse) the content feed, for example, by scrolling or performing some gesture through a display screen of the computing device, to access the different content items that are available in the content feed. In various embodiments, a content item can be an image, video, audio file, page, user profile, group, story, place (e.g., point of interest, city, etc.), or post, to name some examples.

In some instances, users of the social networking system can be presented with surveys in their respective content feeds. However, it can be difficult to optimally survey users since such surveying generally needs to be done in a manner that prevents most, if not all, bias. In one example, bias may result if users are targeted randomly for the survey. Such bias can result, in part, because user IDs (identifiers) may be assigned to users based on some shared attribute among the users. For example, users in one region (e.g., North America) may be assigned user IDs from a set of contiguous user IDs (e.g., 1001, 1002, 1003, etc.). In another example, users that are associated with the same entity (e.g., college) may be assigned user IDs from another set of contiguous user IDs (e.g., 5001, 5002, 5003, etc.). In this example, bias may result since users that are similar to one another in some aspect are likely to be assigned user IDs from the same set of user IDs.

An improved approach rooted in computer technology overcomes the foregoing and other disadvantages associated with conventional approaches specifically arising in the realm of computer technology. In various embodiments, for each survey question, user IDs can each be mapped, or hashed, to a uniformly distributed value between 0 and 1. A number of users to be targeted over a set of time intervals can be specified or determined. In one example, the number of users to be targeted can be specified by the survey creator. In another example, the number of users to be targeted can be determined based, in part, on a sampling rate. For example, a sampling rate can indicate a number of responses desired over a given period of time (e.g., 5,000 responses per week). In addition, the number of users to be targeted can be adjusted based on at least an expected response rate (e.g., 50% response rate from web users, 100% response rate from mobile users, etc.) and the number of expected impressions (e.g., the number of users that are expected to satisfy any actions that trigger the survey). A sampling bucket, or window, size can be determined based on the number of users to be targeted and the number of users that are available to be targeted in the uniform distribution. This sampling window moves across the uniform distribution with respect to the specified time interval (e.g., daily, weekly, monthly, etc.). In some embodiments, the sampling window references a numerical range that can be adjusted based on time (e.g., 0.0 to 0.1 during week 1 of surveying, 0.1 to 0.2 during week 2 of surveying, etc.). Users that have a respective hashed user ID value that is within the numerical range referenced by the sampling window are eligible for the survey. In some embodiments, a survey can be associated with one or more contextual actions that trigger the survey. In such embodiments, the survey can be presented to a user when i) the user performs an action that triggers the survey and ii) the action is performed while the user is being sampled. As used herein, the term survey is also intended to include polls that may be conducted on users of the social networking system.

FIG. 1 illustrates an example system 100 including an example content provider module 102 and a user device module 112, according to an embodiment of the present disclosure. As shown in the example of FIG. 1, the content provider module 102 can include a content module 104 and a survey module 106. In some instances, the example system 100 can include at least one data store 108. The user device module 112 can include an interface module 114 and a user survey module 116. The content provider module 102 and the user device module 112 can communicate with one another over a network 120, e.g., the Internet. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 and the user device module 112 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 and the user device module 112 can be implemented, in part or in whole, as software running on one or more computing devices or systems, such as on a user computing device or client computing system. For example, the user device module 112, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 and the user device module 112 can, in part or in whole, be implemented within or configured to operate in conjunction with a social networking system (or service), such as the social networking system 630 of FIG. 6. It should be understood that there can be many variations or other possibilities.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102 including, for example, data corresponding to surveys to be conducted, respective actions that trigger such surveys, as well as respective user distributions to be surveyed. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

In various embodiments, the content provider module 102 can be configured to utilize the content module 104 to provide various types of content items that can be presented to a user through a user device module 112. The survey module 106 can be configured to generate surveys based on various parameters specified by survey creators. Such surveys can be presented to users of the social networking system, for example, when users are browsing content items. More details regarding the survey module 106 will be provided below in reference to FIG. 2. The user device module 112 can utilize the interface module 114 to provide an interface (e.g., graphical user interface) through which content items can be presented and accessed. For example, the interface can be provided through a software application (e.g., social networking application) running on a computing device being operated by a user. The user can interact with the interface, for example, by performing touch screen gestures through a display screen of the computing device. In some embodiments, content items can be presented through the interface as part of a content feed, which the user can navigate to access or browse content items. The user survey module 116 can be configured to facilitate the surveying of a user. More details regarding the user survey module 116 will be provided below in reference to FIG. 3.

Figure 2:
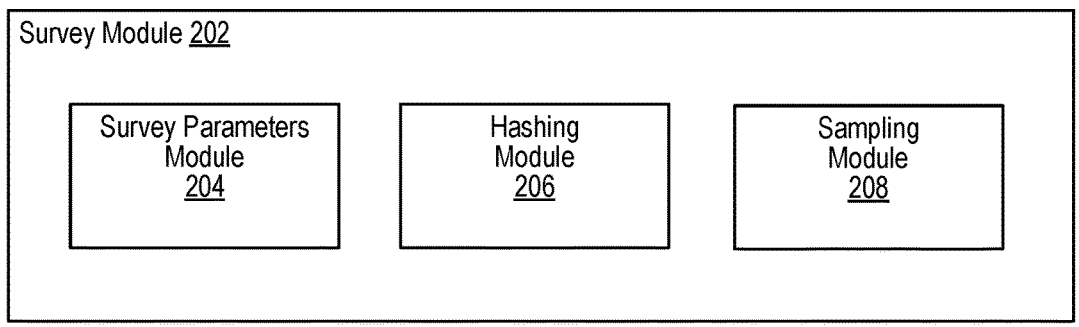
FIG. 2 illustrates an example of a survey module configured to survey users, according to an embodiment of the present disclosure.

FIG. 2 illustrates an example of a survey module 202 configured to survey users, according to an embodiment of the present disclosure. In some embodiments, the survey module 106 of FIG. 1 can be implemented with the survey module 202. As shown in the example of FIG. 2, the survey module 202 can include a survey parameters module 204, a hashing module 206, and a sampling module 208.

The survey module 202 can be configured to generate surveys and to present surveys to users of the social networking system that are eligible for the survey. In some embodiments, users are presented a survey just by being eligible for the survey, as determined by the distribution of users and the sampling window associated with the survey. In some embodiments, a survey can be associated with one or more contextual actions that trigger the survey. In such embodiments, the survey can be presented to a user when i) the user performs an action that triggers the survey and ii) the action is performed while the user is eligible for the survey. In some embodiments, the survey is presented to the user in the user's content feed or in the form of a pop-up window.

The survey parameters module 204 can be configured to create surveys based on various parameters specified by survey creators. In some embodiments, when creating a survey, one or more questions to be presented as part of the survey can specified by a survey creator. The questions asked as part of the survey may be questions that the survey creator wants to monitor over a long period of time. For example, questions included in the survey may be presented as multiple choice questions with a set of pre-defined answers from which a user can choose. In another example, questions included in the survey may be open-ended that allow users to provide their input through one or more free-form input fields. In addition to such questions, the survey may also request comments and/or opinions about various topics or products, user information (e.g., email address, mailing address, demographic information, etc.), among other types of information. In some embodiments, a survey can be associated with one or more triggering actions that must be performed by a user before the user is eligible for the survey. In one example, a survey may be triggered when a user posts a content item through the social networking system. In this example, the survey can be presented to a user when the user posts a content item while being eligible for the survey. In some embodiments, the triggering actions can be more granulated. In such embodiments, a survey can be triggered when a user performs a triggering action with respect to a particular setting and/or attribute. For example, a survey may be triggered when a user posts a content item through the social networking system to a specified privacy setting (e.g., post to public, post only to friends, post only to myself). In this example, the survey can be presented to a user when the user posts a content item using the specified privacy setting and while being eligible for the survey. In some embodiments, a user is eligible for a survey when the user's hashed numerical value in the uniform distribution is within the numerical range referenced by the sampling window at the time the user performs the triggering action(s), as described below.

The hashing module 206 can generate a mapping of users that are eligible to be targeted by a survey. In various embodiments, the mapping is determined by hashing user IDs to a uniformly distributed number between 0 and 1. Each user ID can be hashed using a predefined hash function and a corresponding salt using generally known approaches. For example, a user ID 5001 may be hashed using a function to a numerical value 0.55 while a user ID 5002 may be hashed to a numerical value 0.12. By hashing user IDs as such, any bias that was inherent in the assigning of the user IDs can be reduced or eliminated. In general, the same mapping of users generated for a survey is used to target users across different interfaces. For example, a user may access the social networking system through a web browser (www user) and also through a software application (e.g., social networking app) running on their mobile device (mobile user). In some embodiments, if a user has already provided a response to the survey through one interface (e.g., mobile), then any responses provided by the user through a different interface (e.g., www) are excluded from the set of survey responses. In some embodiments, a user that has already been presented with a survey (or has responded to the survey) through one interface is not presented with the same survey through a different interface. In some embodiments, the hashing module 206 generates a separate mapping of users for each different survey. For example, a first uniform distribution of users can be generated for a first survey and a second uniform distribution of users can be generated for a second survey. Using separate mappings for different surveys can help reduce the risk of introducing bias across different surveys. That is, generating separate mappings helps ensure that the same users are not targeted across different surveys.

The sampling module 208 can determine a sampling window for each survey. The sampling window can be used to determine which users in a uniform distribution are eligible for a survey at a given time. As mentioned, for each survey, user IDs can be hashed to generate a uniform distribution of users that each have a numerical value between 0 and 1. In some embodiments, the sampling window references an adjustable numerical range between 0 and 1 and any users having a respective numerical value that corresponds to the numerical range are eligible for the survey. The sampling window can be configured to target a specified number of users over one or more time intervals. In one example, a survey creator may specify that 100,000 users should be targeted by the survey every week. In this example, if the total number of users that are available for targeting is 1 million, then the size sampling window is 0.1

$$\left(\text{that is, } \frac{100{,}000 \text{ targeted users}}{1{,}000{,}000 \text{ total users}}\right).$$

Continuing with this example, in the first week, the sampling window can first be aligned with the numerical range 0.0 to 0.1. Thus, during the first week, users that have a hashed numerical value between 0.0 and 0.1 are eligible for the survey. As mentioned, in some embodiments, the survey may be associated with one or more triggering actions. In such instances, users that are eligible for the survey also need to perform the triggering actions before the survey is presented to them. After the first week has elapsed, the sampling window can be adjusted to correspond to the next 100,000 users, for example, by adjusting the numerical range 0.1 to 0.2. In some embodiments, once the sampling window has reached the end of the uniform distribution, the users can be mapped to a new uniform distribution and the sampling window can be reset to the beginning of the distribution to continue surveying. In this example, once the sampling window has been adjusted to the numerical range of 0.9 to 1, the users can be mapped to a new uniform distribution and the sampling window can be reset to the beginning of the distribution (e.g., numerical range 0.0 to 0.1) to continue the surveying. In some embodiments, when generating a new distribution of users, the users included in the distribution can change depending on which users were added or removed from the social networking system. In some embodiments, the size of the sampling window can be adjusted even after the surveying has begun. For example, a sampling window that was sized to survey 100,000 users over each time interval can be increased so that 200,000 users are surveyed over each time interval. Similarly, a sampling window that was sized to survey 100,000 users over each time interval can be decreased so that 50,000 users are surveyed over each time interval. In such embodiments, the sampling window can be aligned with respect to the distribution of users in a manner that prevents users from being targeted by the same survey more than once.

In some embodiments, the sampling window is sized to achieve a number of desired responses. For example, a survey creator may want 5,000 user responses to a survey each week. To achieve the number of desired responses, the sampling module 208 can perform tests to determine user response rates for each interface through which the users can be presented with the survey. For example, the response rate for users accessing the social networking system through a web browser may be 50 percent (www users) while the response rate for users accessing the social networking system through a software application (e.g., social networking app) running on their mobile devices may be 100 percent (mobile users). The sampling module 208 can also perform tests to determine an impression rate (e.g., a number of users that are expected to perform actions through the social networking system that trigger the survey). The sampling window can be sized based on the desired number of responses in view of the response rate and the impression rate.

Figure 3:
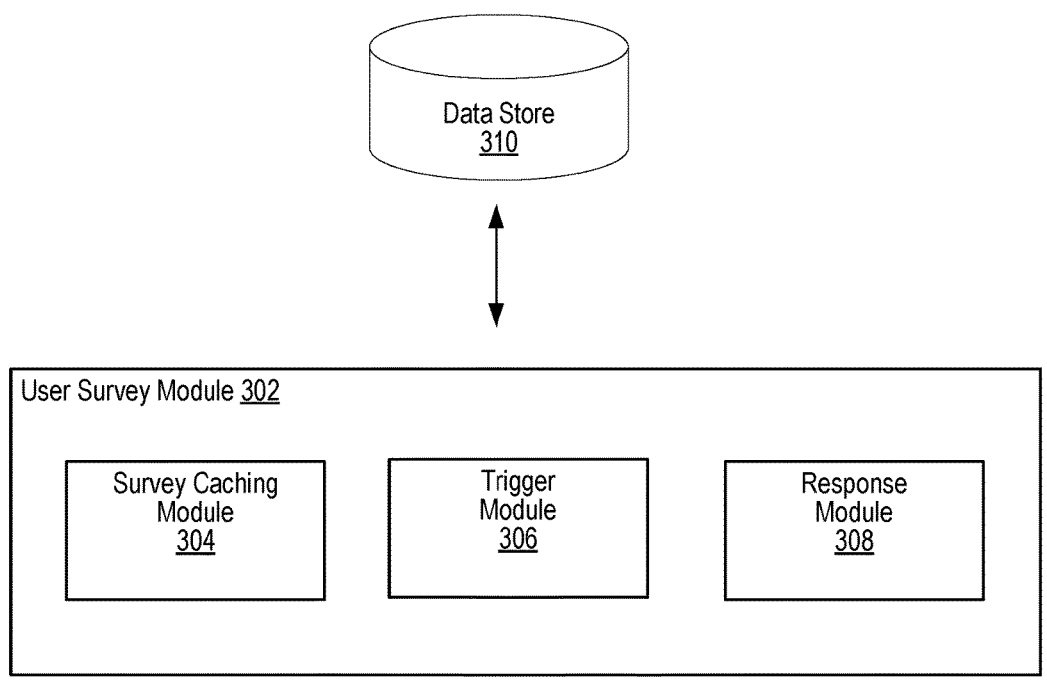
FIG. 3 illustrates an example of a user survey module configured to facilitate the surveying of users through mobile devices, according to an embodiment of the present disclosure.

FIG. 3 illustrates an example of a user survey module 302 configured to facilitate the surveying of users through mobile devices, according to an embodiment of the present disclosure. In some embodiments, the user survey module 116 of FIG. 1 can be implemented with the user survey module 302. As shown in the example of FIG. 3, the user survey module 302 can include a survey caching module 304, a trigger module 306, and a response module 308. The user survey module 302 can be implemented in a computing device of a user (e.g., the user device 610 of FIG. 6), for example, as part of a software application (e.g., social networking application) running on the computing device.

The survey caching module 304 can be configured to obtain, or download, survey data from the social networking system. The obtained survey data may include any surveys that are active or surveys for which the user is eligible. The survey caching module 304 can cache this survey data in a data store, for example, a data store 310 that is accessible to the computing device of the user. In some embodiments, the survey caching module 304 can automatically remove, or delete, survey data corresponding to any surveys that have expired or surveys in which the user is no longer eligible to participate.

The trigger module 306 can be configured to determine a set of actions that are associated with any surveys that have been obtained by the survey caching module 304. As mentioned, a survey can be associated with one or more actions that trigger the survey. In one example, the survey may be triggered when a user disables notifications from the social networking system. In this example, the trigger module 306 can monitor actions taken by the user while accessing the social networking application. Once a triggering action for a survey is detected, the trigger module 306 can cause the survey to be presented to the user.

The response module 308 can be configured to store data describing the user's responses to surveys. This data can be sent back to the social networking system once a survey is complete or when the computing device is able to communicate with the social networking system.

Figure 4:
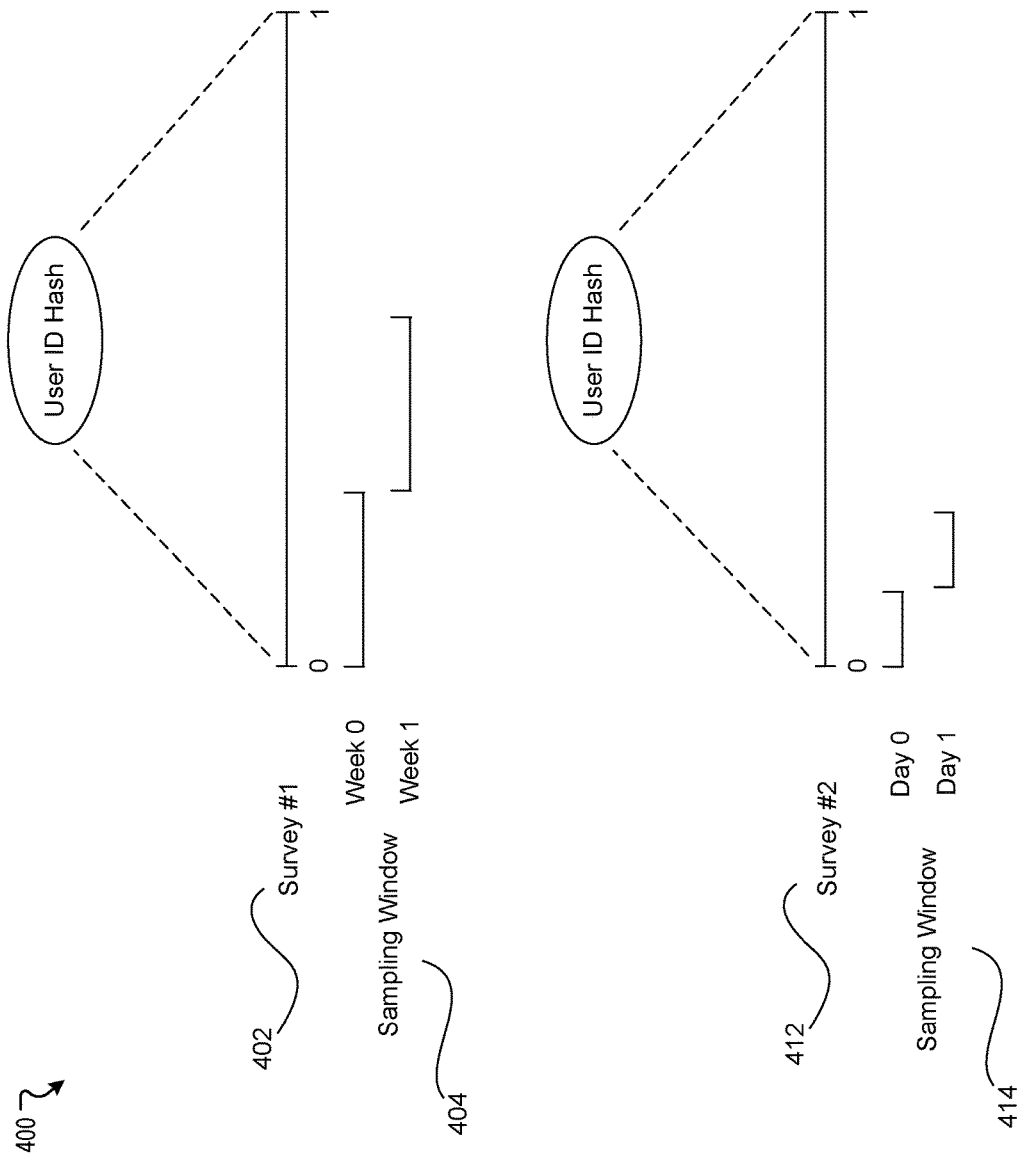
FIG. 4 illustrates an example diagram showing uniform distributions of users to be surveyed, according to an embodiment of the present disclosure.

FIG. 4 illustrates an example diagram 400 showing uniform distributions of users 402, 412 to be surveyed, according to an embodiment of the present disclosure. The example diagram 400 illustrates a first distribution of users 402 that corresponds to a first survey and a second distribution of users 412 for a second survey. As mentioned, each distribution of users 402, 412 can be generated by uniformly hashing user IDs to a numerical value between 0 and 1. In this example, the distribution of users 402 is surveyed using a sampling window 404. The size of the sampling window 404 can be determined based on the requirements specified by the survey creator, as described above. The sampling window 404 can correspond to a numerical range and users that have a hashed user ID value that corresponds to the numerical range are eligible for the survey. Further, the sampling window 404 can be adjusted over a predefined time interval (e.g., daily, weekly, monthly, etc.). In the example of FIG. 4, the sampling window 404 is adjusted on a weekly basis. Similarly, the distribution of users 412 is surveyed using a sampling window 414. The size of the sampling window 414 can be determined based on the requirements specified by the survey creator, as described above. In the example of FIG. 4, the sampling window 404 is adjusted on a daily basis.

FIG. 5 illustrates an example method 500 for surveying users, according to an embodiment of the present disclosure. It should be appreciated that there can be additional, fewer, or alternative steps performed in similar or alternative orders, or in parallel, within the scope of the various embodiments discussed herein unless otherwise stated. At block 502, at least one survey to be presented to users of the social networking system can be determined, wherein the survey is targeted to a number of users at each time interval. At block 504, a uniform distribution of users that may be surveyed is determined, wherein users in the uniform distribution are each assigned a numerical value. At block 506, a sampling window that references a numerical range that is adjusted upon completion of each time interval is determined, wherein users that have been assigned a numerical value within the numerical range are eligible for the survey.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
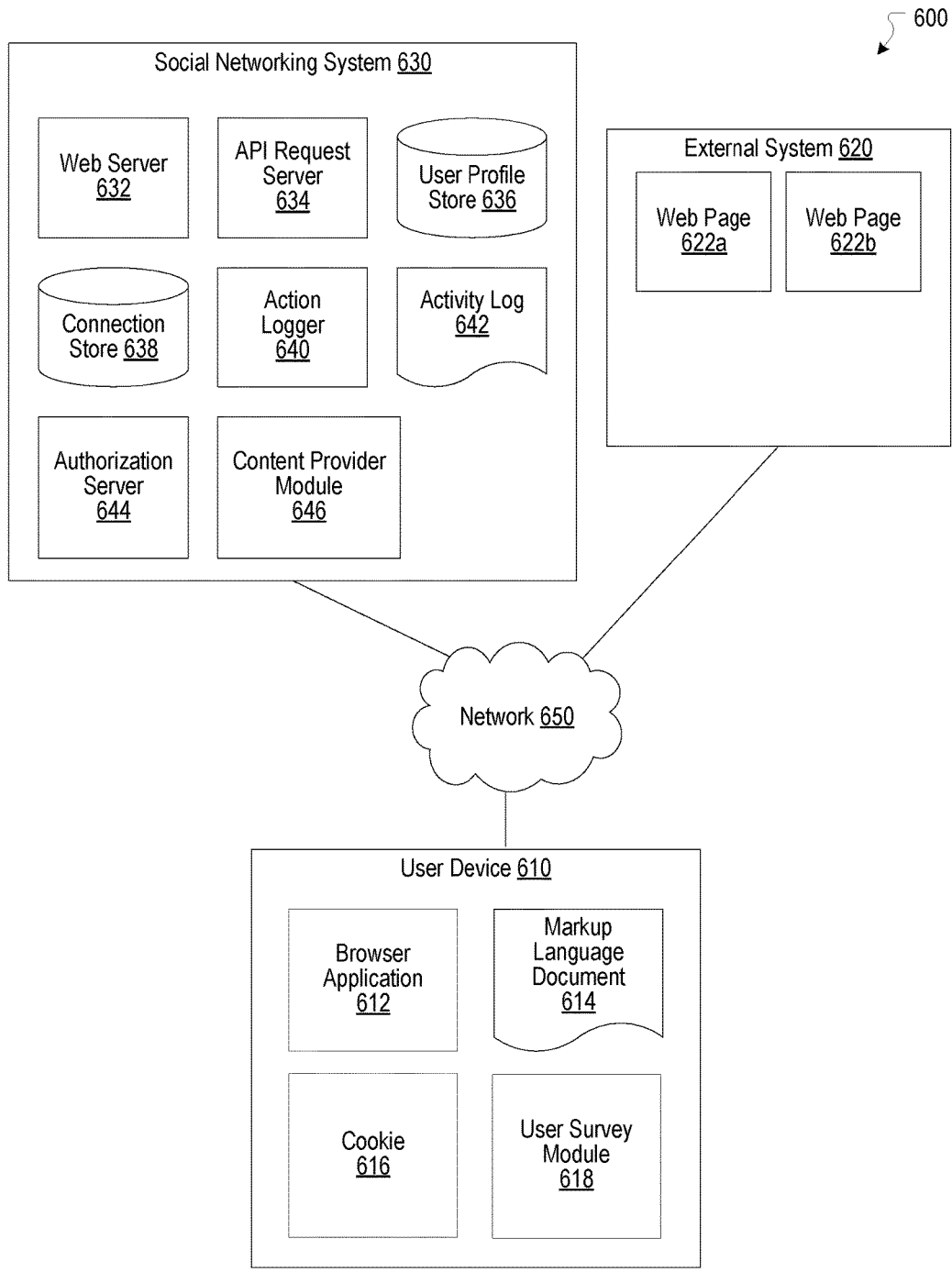
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a user survey module 618. The user survey module 618 can, for example, be implemented as the user survey module 116 of FIG. 1. As discussed previously, it should be appreciated that there can be many variations or other possibilities.

Hardware Implementation

Figure 7:
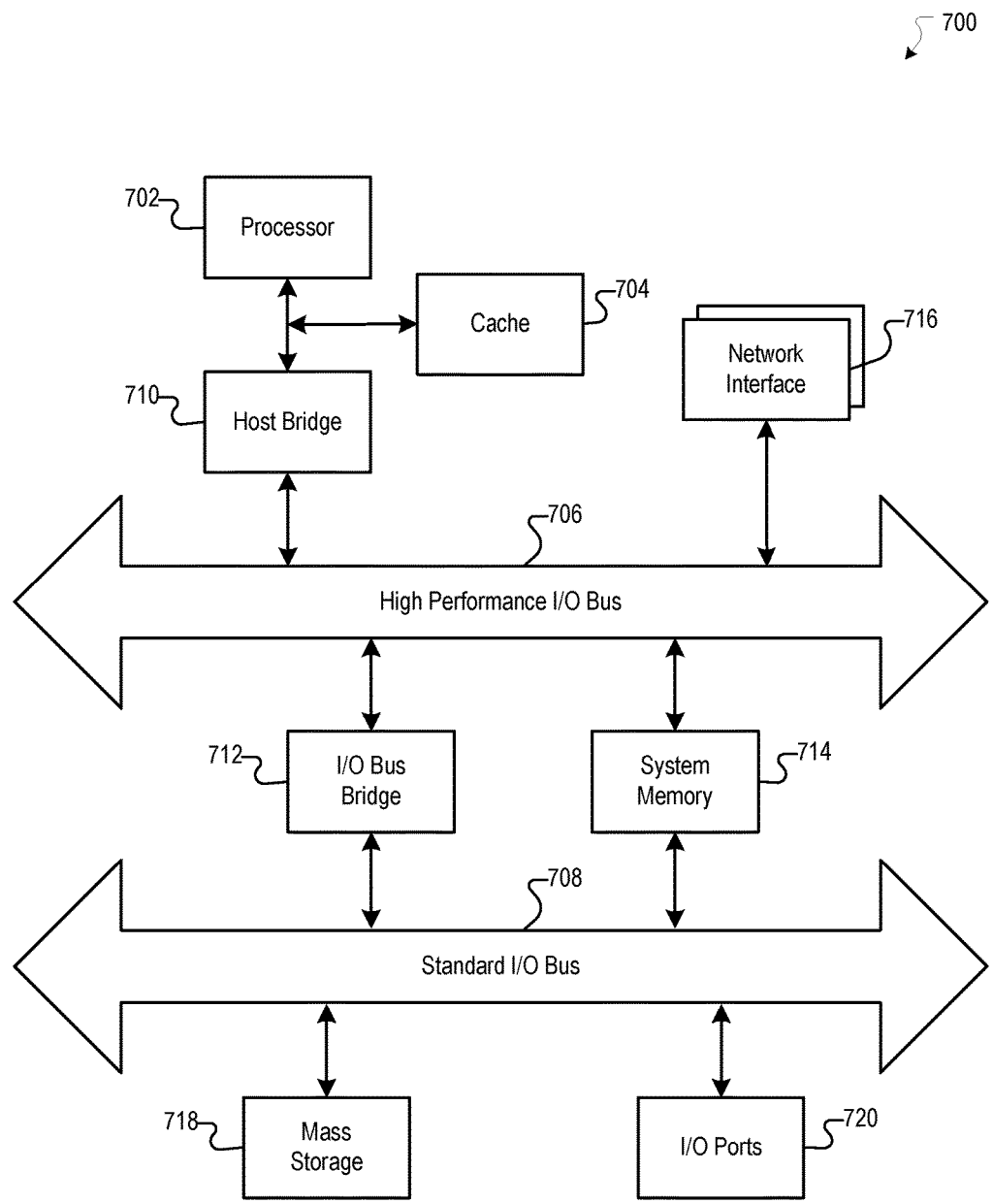
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a social networking system, at least one survey to be presented to users of the social networking system, wherein the survey is targeted to a number of users at each time interval;
   determining, by the social networking system, a uniform distribution of the users of the social networking system that may be surveyed, wherein users in the uniform distribution are each assigned a numerical value;
   determining, by the social networking system, a sampling window that references a numerical range, wherein the sampling window is adjusted upon completion of each time interval, wherein users of the social networking system that have been assigned a respective numerical value within the numerical range are eligible for the survey; and
   providing, by the social networking system, data describing the survey to a computing device of a first user, wherein the survey is cached by the computing device and presented when the sampling window corresponds to a numerical range that includes a numerical value assigned to the first user.

2. The computer-implemented method of claim 1, wherein determining the uniform distribution of users further comprises:
   providing, by the social networking system, a respective user ID of each user to a hash function as input to obtain a corresponding numerical value for the user.

3. The computer-implemented method of claim 1, the method further comprising:
   determining, by the social networking system, that a first user is eligible for the survey; and
   providing, by the social networking system, data describing the survey to a computing device of the first user, wherein the survey is presented through an interface of the computing device.

4. The computer-implemented method of claim 3, the method further comprising:
   receiving, by the social networking system, a response to the survey from the computing device.

5. The computer-implemented method of claim 3, wherein the survey is presented in a content feed corresponding to the first user.

6. The computer-implemented method of claim 1, wherein the survey is associated with at least one triggering action, the method further comprising:
   determining, by the social networking system, that a first user is eligible for the survey;
   determining, by the social networking system, that the first user has performed the at least one triggering action while being eligible for the survey; and
   providing, by the social networking system, data describing the survey to a computing device of the first user, wherein the survey is presented through an interface of the computing device.

7. The computer-implemented method of claim 1, wherein determining the sampling window further comprises:
   determining, by the social networking system, a specified number of users to be presented with the survey at each time interval; and
   determining, by the social networking system, a size of the numerical range referenced by the sampling window based at least in part on the specified number of users.

8. The computer-implemented method of claim 1, wherein determining the sampling window further comprises:
   determining, by the social networking system, a number of desired responses for the survey;
   determining, by the social networking system, a response rate of the users; and
   determining, by the social networking system, a size of the numerical range referenced by the sampling window based at least in part on the number of desired responses and the response rate.

9. The computer-implemented method of claim 1, wherein determining the sampling window further comprises:
   determining, by the social networking system, a number of desired responses for the survey;
   determining, by the social networking system, a first rate at which the users are expected to respond to the survey;
   determining, by the social networking system, a second rate at which users are expected to perform a triggering action associated with the survey; and
   determining, by the social networking system, a size of the numerical range referenced by the sampling window based at least in part on the number of desired responses, the first rate, and the second rate.

10. A system comprising:
at least one processor; and
a memory storing instructions that, when executed by the at least one processor, cause the system to perform:
determining at least one survey to be presented to users of the social networking system, wherein the survey is targeted to a number of users at each time interval;
determining a uniform distribution of the users of the social networking system that may be surveyed, wherein users in the uniform distribution are each assigned a numerical value;
determining a sampling window that references a numerical range, wherein the sampling window is adjusted upon completion of each time interval, wherein users of the social networking system that have been assigned a respective numerical value within the numerical range are eligible for the survey; and
providing data describing the survey to a computing device of a first user, wherein the survey is cached by the computing device and presented when the sampling window corresponds to a numerical range that includes a numerical value assigned to the first user.

11. The system of claim 10, wherein determining the uniform distribution of users further causes the system to perform:
providing a respective user ID of each user to a hash function as input to obtain a corresponding numerical value for the user.

12. The system of claim 10, wherein the system further performs:
determining that a first user is eligible for the survey; and
providing data describing the survey to a computing device of the first user, wherein the survey is presented through an interface of the computing device.

13. The system of claim 12, wherein the system further performs:
receiving a response to the survey from the computing device.

14. The system of claim 12, wherein the survey is presented in a content feed corresponding to the first user.

15. A non-transitory computer-readable storage medium including instructions that, when executed by at least one processor of a computing system, cause the computing system to perform a method comprising:
determining at least one survey to be presented to users of the social networking system, wherein the survey is targeted to a number of users at each time interval;
determining a uniform distribution of the users of the social networking system that may be surveyed, wherein users in the uniform distribution are each assigned a numerical value;
determining a sampling window that references a numerical range, wherein the sampling window is adjusted upon completion of each time interval, wherein users of the social networking system that have been assigned a respective numerical value within the numerical range are eligible for the survey; and
providing data describing the survey to a computing device of a first user, wherein the survey is cached by the computing device and presented when the sampling window corresponds to a numerical range that includes a numerical value assigned to the first user.

16. The non-transitory computer-readable storage medium of claim 15, wherein determining the uniform distribution of users further causes the computing system to perform:
providing a respective user ID of each user to a hash function as input to obtain a corresponding numerical value for the user.

17. The non-transitory computer-readable storage medium of claim 15, wherein the computing system further performs:
determining that a first user is eligible for the survey; and
providing data describing the survey to a computing device of the first user, wherein the survey is presented through an interface of the computing device.

18. The non-transitory computer-readable storage medium of claim 17, wherein the computing system further performs:
receiving a response to the survey from the computing device.

19. The non-transitory computer-readable storage medium of claim 17, wherein the survey is presented in a content feed corresponding to the first user.

* * * * *